No. 697,035. Patented Apr. 8, 1902.
C. P. STEINMETZ.
SYSTEM OF ELECTRIC DISTRIBUTION.
(Application filed Aug. 19, 1901.)
(No Model.)
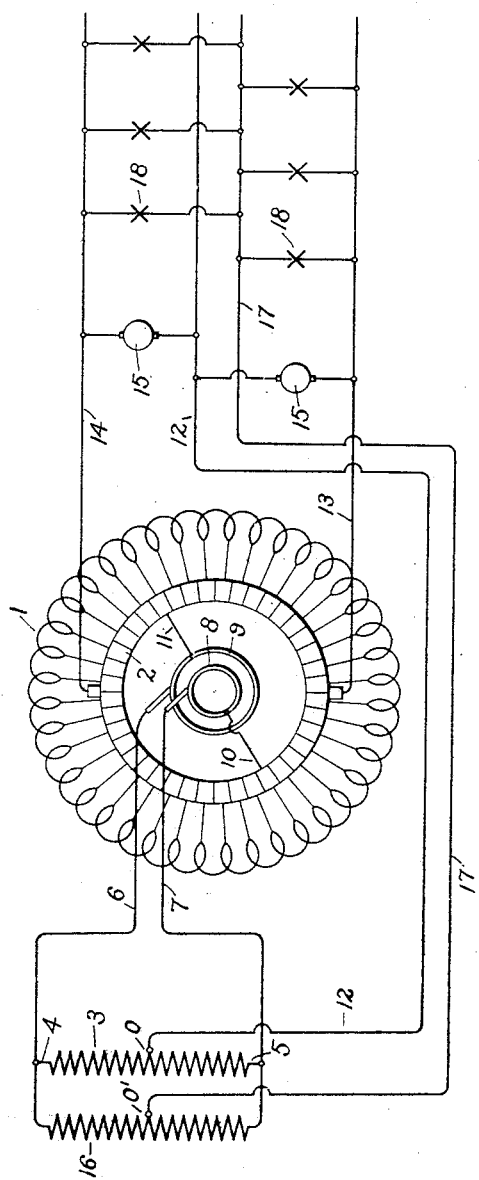
Witnesses.
John Ellis Glenn.
Benjamin B. Hull.
Inventor.
Charles P. Steinmetz.
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRIC DISTRIBUTION.

SPECIFICATION forming part of Letters Patent No. 697,035, dated April 8, 1902.

Application filed August 19, 1901. Serial No. 72,470. (No model.)

*To all whom it may concern:*

Be it known that I, CHARLES P. STEINMETZ, a citizen of the United States, residing at Schenectady, in the county of Schenectady, State of New York, have invented certain new and useful Improvements in Systems of Electric Distribution, (Case No. 2,081,) of which the following is a specification.

When multiple-conductor direct-current systems—such, for example, as the well-known three-wire system—are to be derived from commutating dynamo-electric machines through connection of the neutral conductor to a point having a potential neutral with respect to the winding to which the commutator is connected, trouble frequently arises where unbalanced loads are either thrown on or off of the system—as, for example, if a motor be started from one side of the system. The unbalancing of load produced by thus starting the motor causes a drop in voltage of the system, which is particularly objectionable in case electric lights or other translating devices are also supplied by the system.

Where the neutral point is derived through the connection of transformers or compensators to the winding of the dynamo-electric machine, producing or utilizing the direct current, the drop in potential caused by unbalanced load is largely due to the ohmic resistance of said transformers or compensators the windings of which are traversed by the current flowing in the neutral conductor. I have discovered that the objections noted may be obviated by providing separate points of neutral potential and connecting thereto a corresponding number of neutral conductors. Translating devices, such as incandescent lamps, connected between one of these neutral conductors and the direct-current mains will therefore be comparatively unaffected by the load thrown onto the system through connection or connections between another of said neutral conductors and one or more of said mains.

My invention is capable of numerous embodiments, one of which is for purposes of illustration described in the following specification, taken in connection with the accompanying drawing.

The points of novelty which characterize the invention are set forth in claims appended hereto.

In the drawing, 1 indicates a winding of a dynamo-electric machine, and 2 a commutator connected in the usual manner to this winding. The winding and commutator thus indicated may belong, for example, either to a direct-current generator, a direct-current motor, a rotary converter, a double-current generator, or the like. The drawings, however, illustrate only so much of the machine as is necessary to an understanding of the particular invention in this case.

The points of neutral potential with respect to the winding 1 may be derived each in one of several different ways now well understood in the art. By way of illustration I have in the drawing shown compensators used for this purpose. Thus the compensator 3 has its terminals 4 5 connected through leads 6 7 to a pair of collector-rings 8 9, electrically joined to points in the windings 1 having a single-phase relation to each other. Taps 10 and 11 serve to make these connections between the collector-rings and the winding 1. The middle point 0 of the compensator 3 thus connected is of neutral potential. The neutral conductor 12, connected to this neutral point, constitutes, in connection with the direct-current mains 13 14, a three-wire system by which translating devices of any desired character—such, for example, as motors 15—may be fed.

A separate point of neutral potential may be derived in the same manner as already described or by other arrangements well understood in the art. It is, however, convenient in the present instance to derive this point of neutral potential by connecting another compensator 16 in parallel with the compensator 3, as shown. The middle point 0' of this compensator 16 thereby constitutes another point of neutral potential, to which the second neutral conductor 17 is connected. This conductor coöperates with the direct-current mains 13 14 to produce a three-wire system which is independent of the first-mentioned system to the extent that the neutral conductors of the two systems are independent. Translating devices, such as lamps 18, may be connected between the neutral conductor 17 and the direct-current mains, and when thus connected will be comparatively unaffected by unbalanced loads, such as motors, thrown on or off between the direct-current mains and the neutral conductor 12. This, as already intimated, is largely due to the fact that current flowing in one neutral conductor causes an ohmic drop of potential in the winding of that compensator only to which it is directly connected and leaves the ohmic drop of potential in the other compensator unaffected, whatever it may happen to be.

What I claim as new, and desire to secure by Letters Patent of the United States, is—

1. The combination of direct-current mains, and a plurality of separate neutral conductors, each constituting with said mains a multiple-wire direct-current system of distribution.

2. The combination of direct-current mains, a plurality of neutral conductors, means for maintaining said conductors at a potential intermediate between that of said mains, and translating devices connected between said neutral conductors and said mains.

3. The combination of a dynamo-electric machine having a winding provided with a commutator, conductors connected to brushes on said commutator, means for deriving a plurality of points each having a potential neutral with respect to said winding, and conductors extending from said points.

4. The combination of a winding provided with a commutator, a plurality of compensators connected in multiple to each other and to points in said winding, and conductors leading from points in the windings of said compensators.

5. The combination of a winding provided with a commutator, means for deriving separate points each of neutral potential with respect to said winding, and conductors extending respectively from said points.

6. The combination of a winding provided with a commutator, windings connected with the first-mentioned winding and carrying alternating currents, and conductors adapted to carry direct current extending respectively from points in the last-mentioned windings.

In witness whereof I have hereunto set my hand this 17th day of August, 1901.

CHARLES P. STEINMETZ.

Witnesses:
BENJAMIN B. HULL,
MARGARET E. WOOLLEY.